United States Patent [19]

Thomas

[11] 4,358,896
[45] Nov. 16, 1982

[54] WORKPIECE LOCATOR

[76] Inventor: William L. Thomas, 1122 Sumner, Lincoln, Nebr. 68502

[21] Appl. No.: 204,607

[22] Filed: Nov. 6, 1980

[51] Int. Cl.³ .............................................. G01B 5/14
[52] U.S. Cl. .............................. 33/181 R; 33/169 R; 33/185 R
[58] Field of Search ............. 33/169 R, 169 C, 181 R, 33/185 R, 189; 408/75, 116, 241 G, 241 S

[56] References Cited

U.S. PATENT DOCUMENTS

| | | | |
|---|---|---|---|
| 2,435,256 | 2/1948 | Whitmore | 408/116 |
| 2,483,743 | 10/1949 | Turrettini | 33/185 R |
| 2,721,390 | 10/1955 | Pasturczak | 33/185 R |
| 3,069,781 | 12/1962 | Klaiban | 33/185 R |
| 3,228,112 | 1/1966 | Hanks | 33/181 R |

FOREIGN PATENT DOCUMENTS

| | | | |
|---|---|---|---|
| 634186 | 8/1936 | Fed. Rep. of Germany | 33/181 R |
| 2029993 | 12/1970 | Fed. Rep. of Germany | 33/185 R |
| 706838 | 4/1954 | United Kingdom | 33/185 R |

OTHER PUBLICATIONS

*Metalworking Production,* "Centering Attachment", Oct. 1955, p. 44.

*Primary Examiner*—Richard R. Stearns
*Attorney, Agent, or Firm*—Vincent L. Carney

[57] ABSTRACT

To locate a workpiece on the table of a drill press, the workpiece locator includes a shaft and a slide. The shaft is adapted to be mounted to the drill press spindle by a chuck and the slide is movably mounted to be adjusted in position perpendicular to the longitudinal axis of the shaft by a predetermined amount, which corresponds to the distance between the hole that is to be drilled and one side of the workpiece. A second side of the workpiece is located by measuring from a center line on the slide.

25 Claims, 13 Drawing Figures

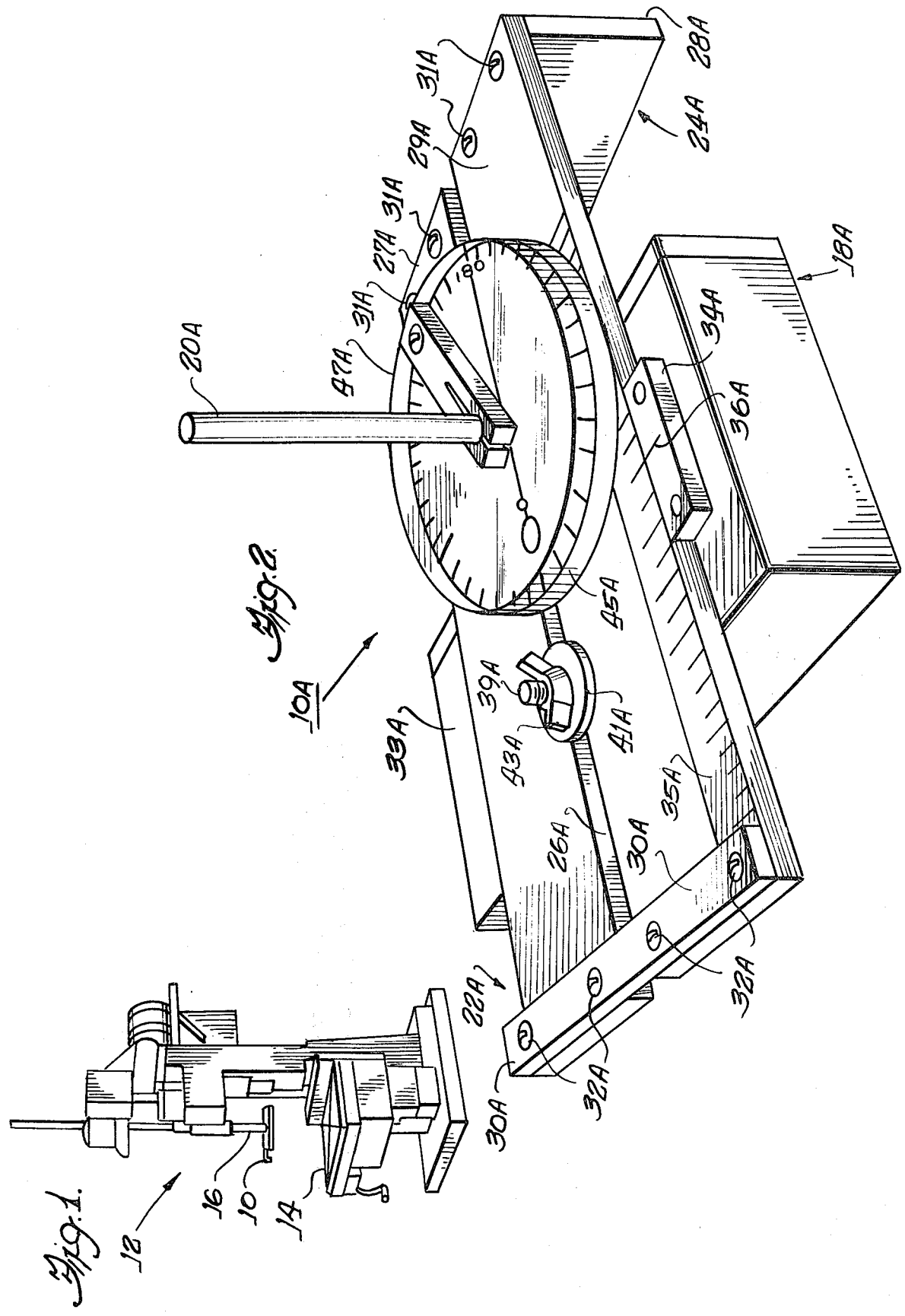

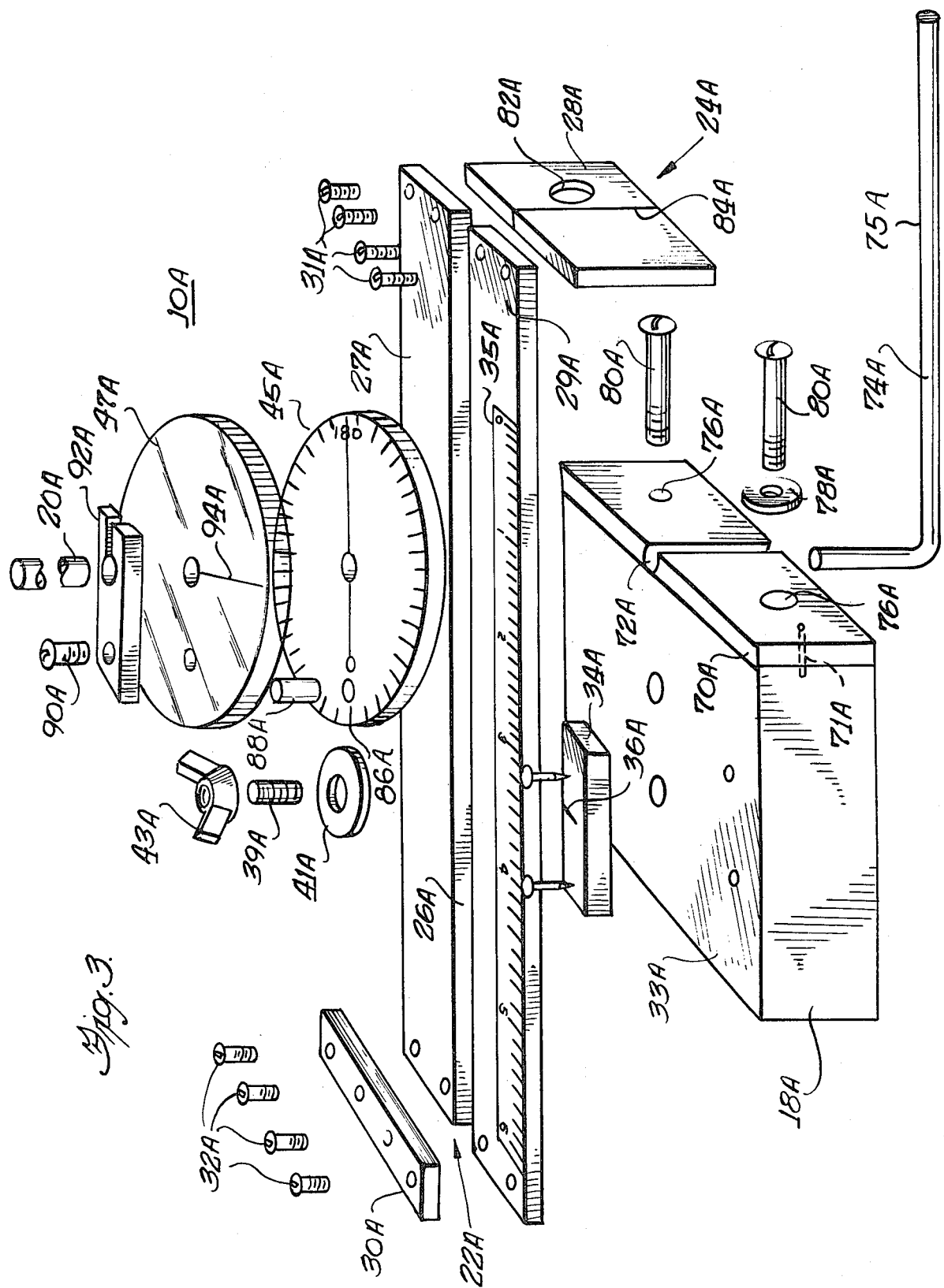

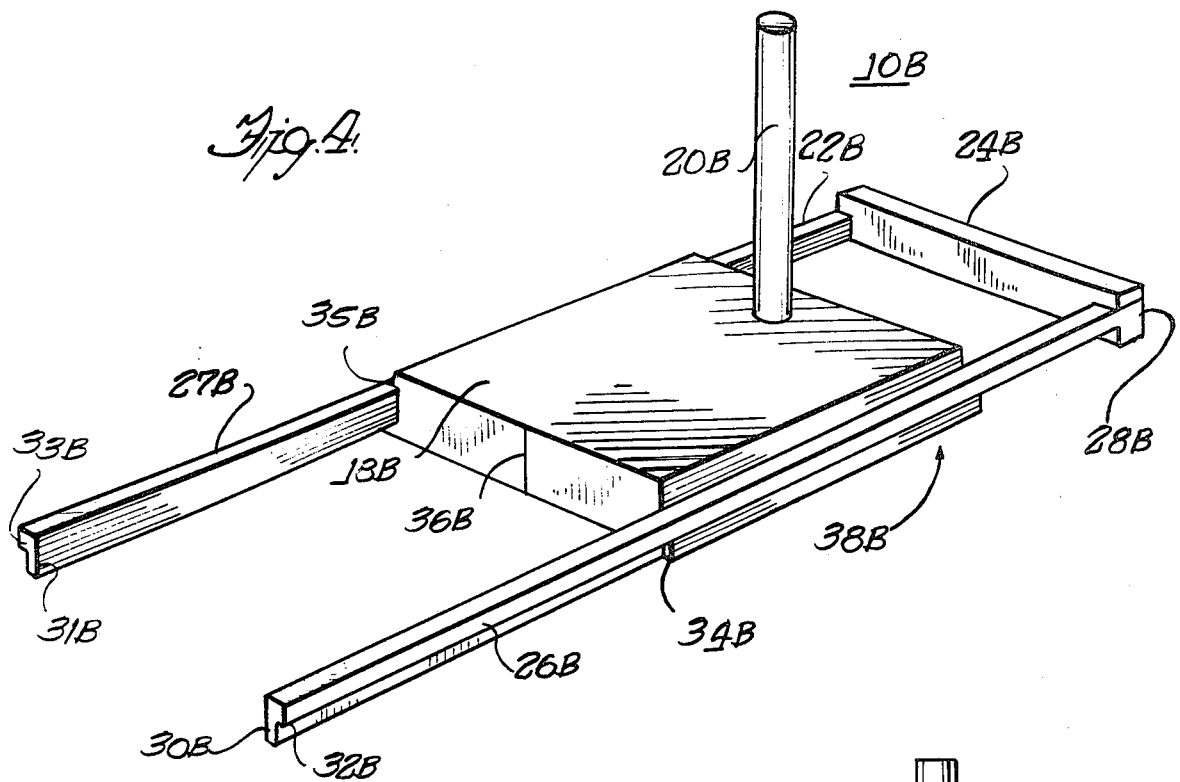
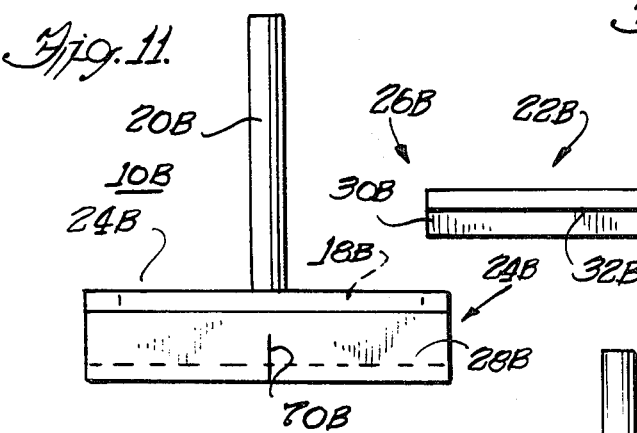
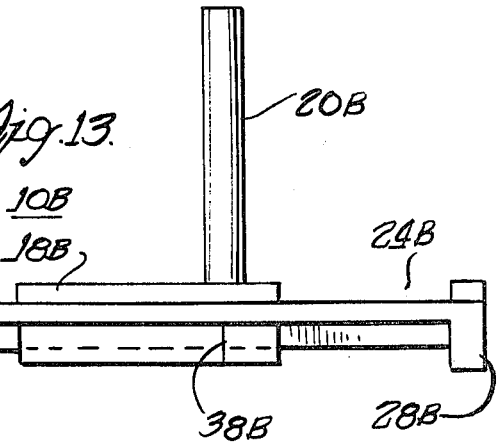
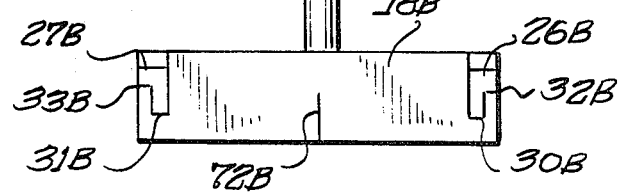

U.S. Patent  Nov. 16, 1982  Sheet 4 of 4  4,358,896
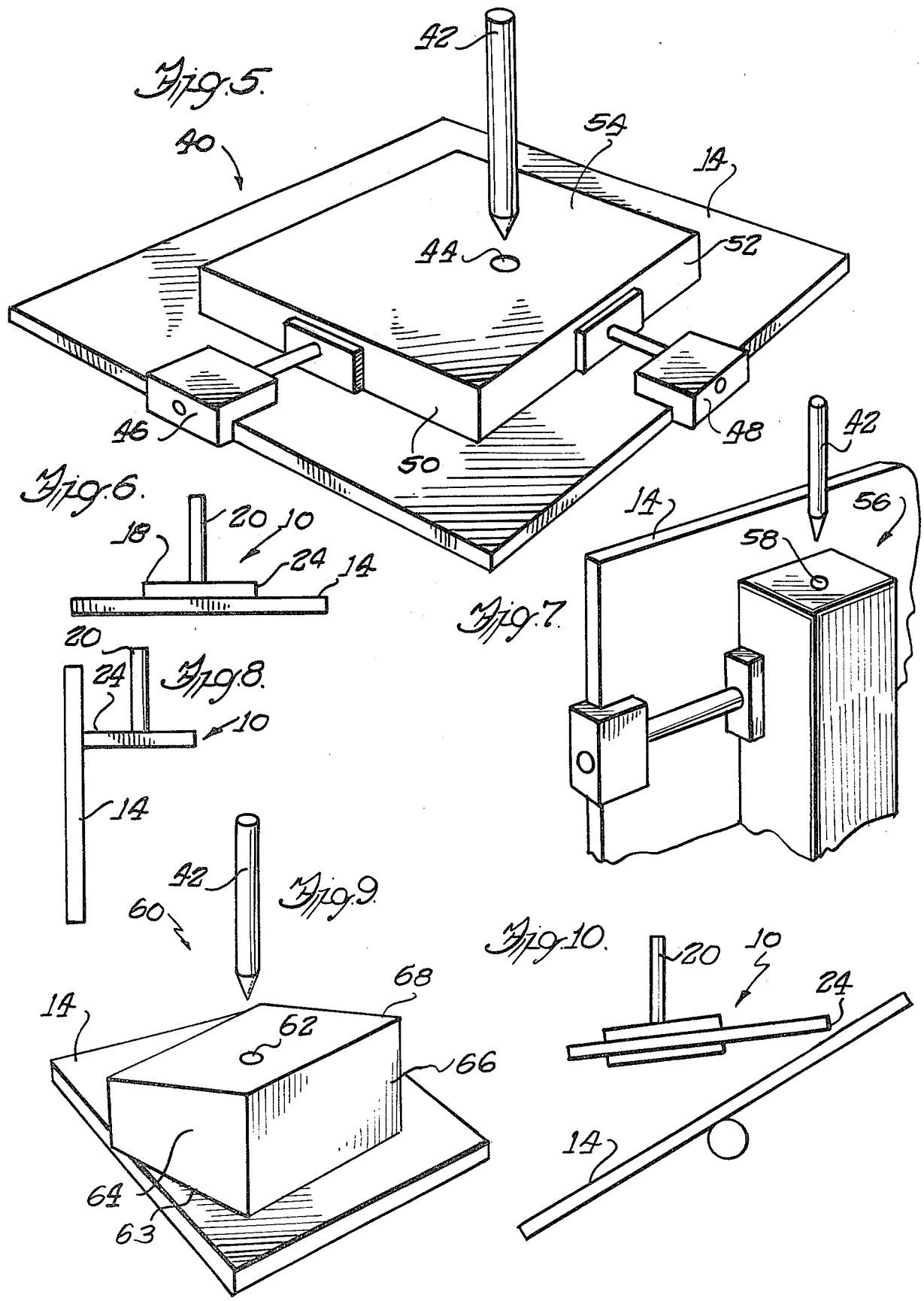

WORKPIECE LOCATOR

This invention relates to workpiece locators.

It is known to locate a workpiece on a table prior to performing machining on it by manual measurement with the aid of workpiece locators and then to hold the workpiece in place by fences. Some workpiece locators include slides with indicia on them so that the fence may be positioned at a certain location. There may be several slides each of which is adjustable to establish a corresponding side of the workpiece.

In the prior art workpiece locators, the distance from a fixed location on the table, such as from a side of the table, is measured from that side. The workpiece locator aids in positioning the fence at the fixed distance from that side of the table.

The prior art workpiece locators have the disadvantages of being complicated and relatively difficult to use because they rely on the side of the table as a principal reference. It is particularly difficult to determine the distance of the fence from the side of the table when the table is at an angle to the tool that is to perform the work. In such a case, the calculation of this distance involves trigonometric calculations.

Accordingly, it is an object of the invention to provide a novel workpiece locator.

It is a further object of the invention to provide a novel method for locating a workpiece on a table.

It is a still further object of the invention to provide a novel workpiece locator which is simple and easy to use.

It is a still further object of the invention to provide a method for locating a workpiece which is relatively easy to use.

It is a still further object of the invention to provide a method and apparatus for locating a workpiece in which the distances for the fences to hold the workpiece are measured from the holder for the working tool.

It is a still further object of the invention to provide a workpiece locator and method for locating a workpiece in which the distances dimensioned on drawings from the point of machine working are used directly to locate the workpiece, even when the table is at an angle.

In accordance with the above and further objects of the invention, a workpiece locator includes a shaft and a movable portion. The shaft is positioned to be affixed to the tool holder of a machine such as to the spindle of a drill press and a movable portion is positioned to move with respect to that shaft so that the distance of the movable portion from the shaft corresponds to the distance from the working tool of the machine.

In operation, once the shaft has been fastened to the machine, the movable portion is adjusted to a dimension from that point of operation to one side of the workpiece. With the movable means adjusted, the workpiece locator is brought into contact with the supporting table for the workpiece and a mark is made on the table indicating the distance of the side of the workpiece from the center line of the shaft of the machine.

The location of another side of the workpiece is measured from the first mark. Thus, the position of two sides of a workpiece from the point of machining are located for machining and appliances such as fences may be put in place to permanently maintain the workpiece in position during such machining.

As can be understood from the above description, the workpiece locator and method of using it has several advantages such as: (1) it is simple and economical in construction; and (2) it may be used rapidly and easily.

The above noted and other features of the invention will be better understood from the following detailed description when considered with reference to the accompanying drawings in which:

FIG. 1 is a perspective view of a machine tool and workpiece locator including an embodiment of the invention;

FIG. 2 is a perspective view of the workpiece locator shown in FIG. 1 in accordance with one embodiment of the invention;

FIG. 3 is an exploded perspective view of the embodiment of FIG. 2;

FIG. 4 is a perspective view of another embodiment of the workpiece locator in accordance with the invention;

FIGS. 5-10 are simplified diagrammatic views illustrating the use of the workpiece locators of FIG. 1 to locate three different types of workpieces in accordance with an embodiment of the invention;

FIG. 11 is a front elevational view of the workpiece locator of FIG. 4;

FIG. 12 is a rear elevational view of the workpiece locator of FIG. 4; and

FIG. 13 is a side elevational view of the workpiece locator of FIG. 4.

In FIG. 1, there is shown workpiece locator 10 mounted to a drill press 12 for use in properly locating a workpiece upon which the drill press 12 is to perform work.

The drill press 12 includes as its principal parts: (1) a table 14; (2) a drill press spindle 16; (3) means for rotating the drill press spindle 16 and for moving it vertically upward or downwardly with respect to the table 14; and (4) means for adjusting the angle of the table 14 about a horizontal axis and for adjusting the rotational position of the table 14 about the vertical column of the drill press 12. The drill press spindle 16 is adapted to receive and rotate a drill while the drill is moved downwardly against a workpiece mounted to the table 14 to drill a hole in the workpiece.

The workpiece locator 10 includes a means for mounting it to the drill press spindle 16 and means for establishing the location of two sides of a workpiece with respect to the drill press spindle. The means for locating one of the sides of the workpiece is a slide which is movable with respect to the drill press spindle 16 and the means for locating the other side is a guideline marker.

To locate the position of one side, the slide is movable in a direction perpendicular to the drill press spindle 16. With this structure, the location of a first side of the workpiece on the table with respect to a hole to be drilled by a drill mounted to a drill press spindle 16 is defined by moving the slide until its outer side is a distance from the spindle 16 equal to the dimensioned distance from a hole to the side of the workpiece. Guidelines permit the location of the other side of the workpiece with respect to the drill press spindle 16.

In operation, the workpiece locator 10 is attached to the drill press spindle 16 and the slide is adjusted to represent at least one dimension from a hole to be drilled in a workpiece. It is then located adjacent to the table 14 and indicia located on the table 14 for the positioning of the workpiece so that when the drill press spindle 16 is moved downwardly while rotating a drill bit, a hole is drilled in the workpiece at the dimensioned location from the side. The other side is measured from the mark so that the workpiece can be mounted to the table 14.

In FIG. 2, there is shown a perspective view of one embodiment of the workpiece locator 10A having a body portion 10A, a shaft 20A and a slide 22A. The shaft 20A and the slide 22A are both mounted to the body portion 18A, with the shaft 20A serving to mount the body portion 18A to the drill press spindle 16 (FIG. 1). The slide 22A is slidably mounted to the body portion 18A to provide an adjustment in accordance with the distance from the hole to be drilled and one side of the workpiece.

The shaft 20A is cylindrical and removably fastened at one end to a top flat surface of the body portion 18A, from which it extends orthogonally upwardly. It is of such a size and length to be received by the drill chuck on the drill press spindle 16 (FIG. 1) to hold the body portion 18A with its top surface perpendicular to the longitudinal axis of the drill press spindle 16 and thus to the direction of drilling.

To permit the slide 22A to be adjusted in position with respect to the shaft 20A, the slide 22A is generally flat, having a downwardly extending indicator portion 24A, two flat plate portions 27A and 29A, with a slot 26A extending longitudinally along its length between the plates 27A and 29A having its longitudinal axis orthogonal to the plane of the indicator portion 24A.

The indicator portion 24A has a front surface 28A which is orthogonal to the axis of the slot 26A and aligned with the direction of movement of the slide 22A when it is adjusted with respect to the body portion 18A and to the shaft 20A. It is fastened at its upper edge to the two parallel plates 27A and 29A by screws 31A. At the end of the slide 22A opposite to the indicator portion 24 is a flat fastening member 30A extending across and transverse to the slot 26A. The upwardly extending member 30A is mounted by screws 32A to two parallel flat plates 27A and 29A of the slide 22A which are spaced apart to form the slot 26A.

To permit sliding of the slide 22A, the body portion 18A is shaped generally as a parallelopiped, with one end parallel to the front surface 28A of the indicator portion 24A and its other surfaces being parallel to slot 26A. The shaft 20A passes through the slot 26A and extends orthogonal to the top surface 33A of the body portion 18A. On the top surface 33A of the body portion 18A is fastened an aligning block 34A against which the slide 22A slides and which has an index marker 36A upon it. A metal scale 35A is mounted to the edge of the slide 22A adjacent to the block 34A so that the position of the slide 22A is indicated by the index 36A and scale 35A.

To lock the slide 22A in place and to provide further guidance for linear motion in only one direction, the threaded stud 39A passes through the body portion 18A within the slot 26A of the slide 22A. A washer 41A is held above the slide 22A, overlapping both flat parallel plates 27A and 29A and is held thereon by a wing nut 43A. With this structure, the slide 22A is permitted to move in a single direction by the block 34A and the threaded stud 39A. It is locked in place by tightening the wing nut 43A. The shaft 20A also passes through the slot 26A and thus guides the slide in linear motion.

To adjust the platen of the drill press (FIG. 1), first and second plastic disks 45A and 47A are mounted one on top of the other about the shaft 20A with the longitudinal axis of the shaft 20A passing through their centers. The bottom disk 45A is fixed in position and contains indicia indicating degrees of rotation and the top disk 47A is rotatable about the shaft 20A and may be adjusted so that its indicator mark points at any angle, thus permitting the indication of an angle with respect to an initial setting for purposes to be described hereinafter.

In FIG. 3, there is shown an exploded perspective view of the embodiment of workpiece locator 10A showing details of the body portion 18A, slide 22A and shaft 20A not visible in FIG. 2.

As best shown in FIG. 3, the body portion 18A includes a front surface having a groove 72A extending along its center in a direction perpendicular to the top surface 33A and having a diameter corresponding to the diameter of the shaft 20A. This groove 72A receives the shaft 20A or an alternate shaft member 74A.

To close the groove 72A, a front piece member 70A, formed in the preferred embodiment as two separate parts, is held over the front surface by two screws 80A at 76A, one of which is recessed into the front surface so that a washer 78A and the head of the screw 80A do not project from the front surface. The downwardly extending surface 28A includes an aperture 82A in it which overlies the aperture 76A that is adapted to receive the screw 80A. Thus the screw 80A can be tightened through the aperture 82A. An indicator mark 84A is centrally located on the surface 28A between its ends and extends from under the bottom (not shown) to the top and over the top to indicate a line which is in the same plane as the longitudinal axis of the groove 72A and thus of the shafts 20A and 74A.

While a two piece member is used to align the shaft, other techniques may be used. In the preferred embodiment, one true surface is formed by one piece held in place by a recessed screw and the second piece serves as an adjustable member to provide secure attachment of the shaft. The fastening member 71A in the preferred embodiment is used to keep the true surface from rotation or other motion.

As best shown in FIG. 3, the circular disk 45A has division markers circumferentially spaced around its rim on its top surface, with the division lines having degrees between zero degrees as indicated at 86A and one hundred eighty degrees being diametrically opposed to the zero division. The zero and one hundred eighty-degree divisions are aligned along the longitudinal axis of the groove 26A and a threaded member 88A is inserted into the block 18A through the groove 26A to provide still another aligning member for the slide 22A and to hold the disk 45A in place.

The disk 47A has threaded to it by a screw 90A a handle member 92A by which the disk 47A may be manually rotated and a central aperture through which the shaft 20A passes. With this configuration, the member 92A and disk 47A are free to rotate with respect to the fixed disk 45A but is firmly fastened to the shaft 20A.

The shaft 74A includes an indexing line 75A along its length which is aligned with the index line marker 84A to zero or calibrate the workpiece locator for use with workpieces having angular or irregular sides or of size too large to rest upon the table of the drill press. The zero or one hundred eighty degrees may then be aligned and moved to set a desired angle.

This structure is designed so that the workpiece locator 10A may be fastened to the spindle of a drill press (FIG. 1) and with the indicia marker 84A aligned with 75A and with 94A the locator is indexed to a zero position. It may be turned to any angular position by rotating the body portion 18A while the disk 47A remains fixed and reading the angular rotation.

In FIG. 4, there is shown a perspective view of another embodiment of workpiece locator 10B having a body portion 18B, a shaft 20B and a slide 22B. The shaft 20B and the slide 22B are both mounted to the body portion 18B, with the shaft 20B serving to mount the body portion 18B to the drill press spindle 16 (FIG. 1). The slide 22B is slidably mounted to the body portion 18B to provide an adjustment in accordance with the distance from the hole to be drilled and the side of the workpiece.

The shaft 20B is cylindrical and rigidly fastened at one end to a top flat surface of the body portion 18B, from which it extends orthogonally upwardly. It is of such a size and length to be received by the drill chuck on the drill press spindle 16 (FIG. 1) to hold the body portion 18B with its top surface perpendicular to the drill press spindle 16 and thus to the direction of drilling. It is located near the front surface.

To permit the slide 22B to be adjusted in position with respect to the shaft 20B, the slide 22B is generally H-shaped. It has an indicator portion 24B and first and second legs 26B and 27B fastened to opposite sides of the indicator portion 24B an extending parallel to each other a distance longer than the opposite sides of the body portion 18B which they slidably engage.

The indicator portion 24B has a front surface 28B which is orthogonal to the legs 26B and 27B and orthogonal to the direction of movement of the slide 22B when it is adjusted with respect to the body portion 18B and to the shaft 20B. It is adjustable from a position sufficiently close to the shaft 20B to permit holes to be drilled adjacent to one side of a workpiece to a location sufficient to permit centrally located holes on a large workpiece.

Each of the legs 26B and 27B has a corresponding one of the downwardly extending ears 30B and 31B extending along their length facing each other and adjacent to the body portion 18B for slidable engagement therewith. The downwardly extending ears 30B and 31B form shoulders 32B and 33B in directions away from each other along their length between their distal end and the indicator portion 24B.

To permit sliding of the slide 22B, the body portion 18B is shaped generally as a parallelopiped, having one end parallel to the front surface 28B of the indicator portion 24B, its other two side surfaces facing the parallel legs 26B and 27B, its end surface parallel to its front surface and its top and bottom surfaces being parallel to each other and perpendicular to its other surfaces. The shaft 20B extends orthogonal from its top surface.

On each of the two parallel side surfaces is a different one of two parallel channels 34B and 35B each shaped to receive a corresponding one of the legs 26B and 27B, the outer portions being lower than the top surface of the body portion 18B so that the downwardly extending ears 30B and 31B of the legs 26B and 27B fit within a lower portion and the shoulders 32B and 33B rest on top of the cutaway outer portions. With this structure, the legs 26B and 27B are slidably mounted to opposite sides of the body portion 18B and slide with their ears 30B and 31B fitting within the channels 34B and 35B and their shoulders 32B and 33B resting on the outer surfaces of the channels 34B and 35B to provide motion in a plane orthogonal to the longitudinal axis of the shaft 20B.

On each of the four sides orthogonal to the top surface of the workpiece locator 10B is different one of four downwardly extending indicator lines, the two indicator lines on the front and rear surfaces being on the body portion 18B in a plane through which the longitudinal axis of the shaft 20B passes, which plane is perpendicular to the front surface 28B. The indicator lines on the side surfaces are in a plane parallel to the front surface 28B of the indicator portion 24B and pass through the longitudinal axis of the shaft 20B. The indicator line on the front surface is on the indicator portion 28B of the slide 22B in a plane orthogonal to the surface 28B and passing through the longitudinal axis of the shaft 20B. Two such indicator lines are indicated at 36B and 38B.

Generally, the workpiece locators 10A and 10B are constructed to have a means which can be fastened to the drill press spindle 16 (FIG. 1) and to have a surface which is adjustable in a direction perpendicular to the normal line of drilling. This permits the surface to be adjusted to establish the location of a side of the workpiece at a distance from the center line of the spindle equal to the distance between the center of the hole to be drilled and one of the sides of the workpiece.

This adjustment requires motion in one direction to indicate the location of a first side of the workpiece. In the preferred embodiment, this one direction is the direction of motion of the slides perpendicular to the shafts 20A or 20B. It is also necessary to be able to indicate the location of a second side of the workpiece by measuring from a known point on the slide in a second direction and this will be explained further hereinafter with respect to the other figures.

In the operation of the workpiece locators 10A or 10B, the workpiece locator is fastened to the drill press spindle 16 (FIG. 1). Next the slide of the workpiece locator is adjusted to a distance from the drill press spindle 16 (FIG. 1) equal to the distance between a hole to be drilled in the workpiece and one side of the workpiece and marks are made on the table 14 to indicate the location on the table 14 (FIG. 1) of first and second sides at least for the workpiece with respect to the hole.

To locate the first side, the shaft 20A or 20B is inserted in the drill press chuck mounted to the drill press spindle 16 (FIG. 1) so that its longitudinal axis is coincident with the axis of rotation of the drill press spindle 16 and the slide 22A or 22B is adjusted so that its front surface 28A or 28B is a distance from the longitudinal axis of the shaft 20A or 20B corresponding to the distance to one side of the workpiece. A mark may be made on the table 14 at that point for fences or other fasteners of the workpiece.

To locate the other side, a distance is measured from the first mark on the front surface 28A or 28B. This first mark is at the center line marker of the hole and the distance from this mark to the second side is usually measured in a direction parallel to the front surface 28A or 28B. This distance is generally measured from the center line indication. However, under some circumstances such as when the table is at an angle to the drill press spindle 16, a line coincident with the center line is drawn on the table 14 by moving the drill press spindle 16 (FIG. 1). This procedure is described in further sections in greater detail.

In FIG. 5, there is shown a workpiece 40, a drill bit 42 positioned to drill a hole 44 in the workpiece 40 and first and second fences 46 and 48 mounting the workpiece 40 in position. FIG. 5 illustrates the drilling of a hole in a block shaped as a right regular parallelopiped with sides 50, 52 and 54 being mutually perpendicular and the hole 44 extending through side 54. The table 14 is mounted perpendicular to the axis of the drill bit 42 which moves downwardly to drill the hole 44 at a designated distance from the sides 50 and 52 and in a direction perpendicular to the side 54.

In FIG. 6, the workpiece locator 10 is shown positioned against the table 14 with the shaft 20 perpendicular to the table 14 for the purpose of establishing the location of the fences 46 and 48 to hold the workpiece 40 as shown in FIG. 5. For this type of drilling, the shaft 20 is mounted in the chuck of the drill press spindle 16 (FIG. 1) while the table 14 is in its horizontal position in a vertical drill press as shown in FIG. 1. Thus, the top surface is perpendicular to the drill press spindle 16 (FIG. 1).

The drill press spindle 16 (FIG. 1) is moved downwardly until the workpiece locator 10A or 10B is adjacent to the top of the table 14 and the indicator portion 24A or 24B is moved outwardly from the body portion 18A or 18B a distance corresponding to the distance from the hole 44 and the side 52 as may be dimensioned in a conventional manner such as for example on a blueprint. The center line 84A or 70B on the indicator portion 28A or 28B is then marked on the table 14 and a line is drawn along the indicator portion 28A or 28B which is thus parallel to the side 52. The distance between the hole 44 and the side 50 is measured along this line.

The first line along the indicator portion 28A or 28B indicates the position of one side of the workpiece and may be established by the fence 48 and the second line drawn perpendicular to it establishes the location of the second side 50 for locating the fence 46. Thus the block is positioned so that the drill bit 42 drills the hole 44 at the proper location when: (1) the drill bit 42 (FIG. 5) is in place; and (2) the drill press spindle 16 (FIG. 1) is rotated and moved downwardly.

In FIG. 7, there is shown a relatively long workpiece 56 positioned against a table 14 to have a hole drilled in its top surface 58 by the drill bit 42. Because the workpiece 56 is long, it cannot be mounted on a horizontal table 14 but instead is held against a vertical table with the drill press spindle 16 (FIG. 1) moving the drill bit 42 in a direction parallel to the table 14 to drill the hole.

As best shown in FIG. 8, the workpiece 56 is located on the table 14 by clamping the shaft 20A or 20B within the chuck of the drill press spindle 16 (FIG. 1) and adjusting the slide 22A or 22B to the distance of the hole 58 from the side of the workpiece that is positioned against the table. The table 14 is then placed in its vertical or 90 degree position and it is moved about the vertical axis of the drill press 12 (FIG. 1) until it is adjacent to the indicator portion 28A or 28B of the workpiece locator 10A or 10B. With the table 14 locked in the vertical position and the workpiece 56 positioned against it, the drill bit in the drill press spindle 16 (FIG. 1) is positioned a distance from the edge of the workpiece 56 that is equal to the distance of the hole from the side of the workpiece as set by the slide 22A or 22B (FIG. 2) on the workpiece locator 10A or 10B.

To locate the position of the workpiece on the table 14, the center line is marked from the center line on the indicator portion 24A or 24B of the workpiece locator 10A or 10B. The drill press spindle 16 (FIG. 1) is then moved downwardly and another mark is made. A line is drawn connecting the two marks and a line perpendicular to the connecting line is drawn and the dimension of the hole from one side of the workpiece 56 is measured along the perpendicular line at the measured distance, a fence line is drawn. That line is parallel to the center line of the hole to be drilled to locate one side with the dimension being equal to the distance of the drill bit 42 from the side of the workpiece 56.

If one of the sides of the workpiece is at an angle to the top surface and the hole is to be perpendicular to the top surface, a line is drawn for the centerline of the workpiece as described above and two lines are drawn perpendicular to it. The distance of the angled side may then be measured at the two locations along its axis and measurements obtained for each to position that side of the workpiece. Adjustments can obviously be made for any additional angled sides or holes at an angle to the top surface. For sides parallel to the table that are angled with respect to each other or the hole, the angle of the table is adjusted using the protractor disks 45A and 47A.

In FIG. 9, there is shown a simplified perspective view of a workpiece 60 in which a hole 62 is to be drilled by the drill bit 42 while the workpiece 60 is on the table 14. One side 63 of the workpiece 60 is at an angle to opposite side 68, with the hole 62 being drilled in the top surface 68 directly opposite to the side 63 and adjacent to sides 64 and 66. The hole 62 is to be drilled perpendicular to the top surface 68.

As best shown in FIG. 10, the workpiece 60 (FIG. 9) is located on the table 14 by attaching the shaft 20A or 20B of the workpiece locator 10A or 10B in the chuck at the end of the drill press spindle 16 (FIG. 1) and adjusting the table 14 of the drill press to the angle of the side 63 so that, when the side 63 rests upon the table 14, the top surface 68 is perpendicular to the drill press spindle 16 (FIG. 1).

Many drill presses have tables 14 which are adjustable in a measured angle as indicated on the drill press itself. If a drill press is used which does not have such a means for measuring the angle of the table, the embodiment 10A of a workpiece locator may be used to set the angle of the table. This is done by removing the shaft 20A and inserting the shaft 74A into the groove 72A (FIG. 3) with the shorter end extending upwardly through the slot 26A and into the central apertures in the disks 45A and 47A. When positioned in this manner, the longitudinal axis of the longer end of the shaft 74A is aligned with the groove 26A and the zero or 180 degrees marker 86A on the disk 45A.

The shaft 74A is then mounted in the chuck of the drill press and the angle of the indicator surface adjusted by means of the two disks 45A and 47A until they indicate the angle of the slanted surface of the workpiece. The front indicator surface is now parallel to the angle dimensioned on the drawing and the table 14 may be moved to rest adjacent to it to have the same angle. The workpiece is now ready to be positioned so that its slanted or non-perpendicular surface is contiguous with the table. The workpiece locator 10A is then removed and the shaft 20A replaces the shaft 74A in the normal manner so as to provide for the proper locating of the fences to hold the workpiece in place.

The workpiece locator 10A or 10B is adjusted so that the indicator portion 24A or 24B extends from the longitudinal axis of the shaft 20A or 20B a perpendicular distance equal to the distance between the hole 62 and one side, such as the side 66, of the workpiece 60 (FIG. 9). With the workpiece locator 10A or 10B so adjusted and the table 14 adjusted to the proper angle with the horizontal, the workpiece locator and the table are rotated about the vertical axis of the shaft 20A or 20B and the vertical axis of the drill press 12 (FIG. 1) respectively until the indicator portion 28A or 28B is adjacent to the top surface of the table 14.

A mark is made on the table 14 along the center line of the indicator portion 24A or 24B at the point and a first line is drawn along the bottom front edge of the indicator portion at 28A or 28B.

The workpiece locator 10A or 10B is now adjusted to reduce the distance from the shaft 20A or 20B to the indicator portion 24A or 24B and the workpiece locator 10A or 10B is lowered so that it again touches the table 14 for the making of another mark on the table aligned with the center line of the indicator portion 24A or 24B. This permits the drawing of a second line parallel to the side 64 (FIG. 9) if 64 is perpendicular to 66 which is next to be located. The distance to side 64 is then measured along the first line and a third line is drawn perpendicular to the first line or drawn parallel to the second line. This third line locates side 64, thus the first and third lines locate the sides 64 and 66 so that the workpiece 60 (FIG. 9) may be located on the table 14 and the hole 62 properly drilled.

In FIG. 11, there is shown a front elevational view of the workpiece locator 10B illustrating the center line indicator 70B on the front surface 28B of the indicator portion 24B aligned with the longitudinal axis of the shaft 20B.

The shaft 20B has a diameter of approximately ¼ inch, the body portion 18B has a width of approximately 4 inches and a height of 1½ inches being coincident at its bottom surface with the bottom of the indicator portion 24B. The indicator portion 24 in the front has a width of 2¾ inches and a height of 1½ inches. The dimensions of the workpiece locator 10A are substantially the same.

In FIG. 12, there is shown a rear elevational view of the workpiece locator 10B showing the center line indicator mark 72B aligned with the longitudinal axis of the shaft 20B as it appears on the rear surface of the body portion 18B. The two parallel legs 26B and 27B extend outwardly beyond the rear surface of the body portion 18B.

In FIG. 13, there is shown a side elevational view of a workpiece locator 10B showing the manner in which the downwardly extending ear 30B is cut away to form the shoulder 32B which rests upon an upstanding portion of the body portion 18B, with the indicator portion 24B extending to the same depth as the body portion 18B so as to form a stop at a convenient surface for an indicator mark. The slide of the workpiece locators 10A and 10B is approximately 8 inches long.

From the above description, it can be understood that the workpiece locator of this invention has several advantages such as: (1) it is simple in construction and economical; (2) it can be used to locate workpieces of a variety of different shapes on the table of a drill press; and (3) it can be used quickly and easily.

Although a preferred embodiment of the invention has been described with some particularity, many modifications and variations are possible in the preferred embodiment without deviating from the invention. Therefore, it is to be understood that, within the scope of the appended claims, the invention may be practiced other than as specifically described.

What is claimed is:

1. A method of positioning a workpiece with respect to the direction of motion of a tool mounted to a drive means for performing work on the workpiece, comprising the steps of:

extending an object a distance from a fixed location aligned with the direction of motion of the tool, which distance is equal to the distance from the location work is to be performed on the workpiece to a first side of the workpiece;

indicating on a support means for the workpiece the location at the end of said object after it has been extended by the distance to one side of the workpiece, whereby one side of the workpiece is located with respect to the support means for work by said tool;

measuring on said support means another dimension related to the distance from the location work is to be performed on the workpiece to a second side of the workpiece; and indicating the location of the second side of the workpiece at the end of said second measurement.

2. A method according to claim 1 in which the step of extending an object includes the step of attaching a first portion of said object at said fixed location said object having a second portion extendable at an angle to said direction of motion of said tool.

3. A method according to claim 2 in which the step of extending includes moving said second portion.

4. A method according to claim 3 in which the step of attaching includes the step of attaching a shaft to said drive means to extend in the direction of motion of said tool and perpendicular to direction of motion of said second portion.

5. A method according to claim 4 in which the step of extending includes the step of extending said second portion of said object a distance equal to a dimension on a blueprint which indicates the distance between the location for work to be done and the side of the workpiece.

6. A method according to claim 4 in which the step of extending includes the step of extending at an angle to said shaft a slide member having a mark on it in the plane of and parallel to the center of said shaft.

7. A method according to claim 6 in which the step of indicating on a support means includes the step of marking a support which is at an angle to a direction of motion of said second portion.

8. A method according to claim 7 in which the step of attaching includes the step of attaching said shaft to the spindle of a drill press.

9. A method according to claim 1 in while the step of indicating on said support means includes the step of marking a support means which is at an angle to the direction in which said object is extended.

10. A method according to claim 9 in which the step of extending includes the step of attaching said object to the spindle of a drill press.

11. A method according to claim 1 in which the step of extending includes the step of attaching said object to the spindle of a drill press and the step of extending a portion of said object at an angle to said spindle.

12. Apparatus for positioning a workpiece with respect to a tool held by a tool holder, which tool holder is adapted to move the tool along a path toward and away from the workpiece, comprising:

a workpiece positioning body means;

means for attaching said workpiece positioning body means to said tool holder;

movable means movably attached to said workpiece positioning body means for indicating the position of side of said workpiece;

means for extending said movable means a selected distance up to a predetermined maximum distance; and center line means on said workpiece positioning body means for indicating the center of said tool holder, whereby said movable means may be located in accordance with the dimension from the location where work is to be done by said tool on said workpiece and a side of the workpiece for indicating on a support member the location of one side of the workpiece.

13. Apparatus according to claim 12 in which said means for attaching includes a shaft attached at one end to said workpiece positioning body means.

14. Apparatus according to claim 13 in which said means for extending includes a slide movable with respect to said body means at an angle to the longitudinal axis of said shaft.

15. Apparatus according to claim 14 in which said means for extending includes a means for extending said slide at an angle perpendicular to the longitudinal axis of said shaft.

16. Apparatus according to claim 15 in which center lines are located on three sides of said workpiece positioning body means aligned with the central axis of said shaft.

17. Apparatus according to claim 16 in which said slide includes a flat front surface perpendicular to the direction of motion of said slide and parallel to the longitudinal axis of said shaft.

18. Apparatus according to claim 17 in which said tool holder is a tool holder on a press, whereby a workpiece may be located to have work performed on it by said press.

19. Apparatus according to claim 17 in which said press is a drill press.

20. Apparatus according to claim 12 in which said extending means includes a slide.

21. Apparatus according to claim 20 in which said means for extending includes a slide and guide means for said slide, whereby said slide moves in a direction perpendicular to said tool holder.

22. Apparatus according to claim 21 in which said tool holder is a tool holder of a press.

23. Apparatus according to claim 22 in which said press is a drill press.

24. Apparatus according to claim 12 in which said tool holder is a tool holder of a press.

25. Apparatus according to claim 24 in which said press is a drill press.

* * * * *